Nov. 4, 1969

W. B. STOVALL 3,476,522

HIGH VISCOSITY REACTORS

Filed Nov. 16, 1966

INVENTOR.
William B. Stovall
BY
Robert H. Ware
ATTORNEY

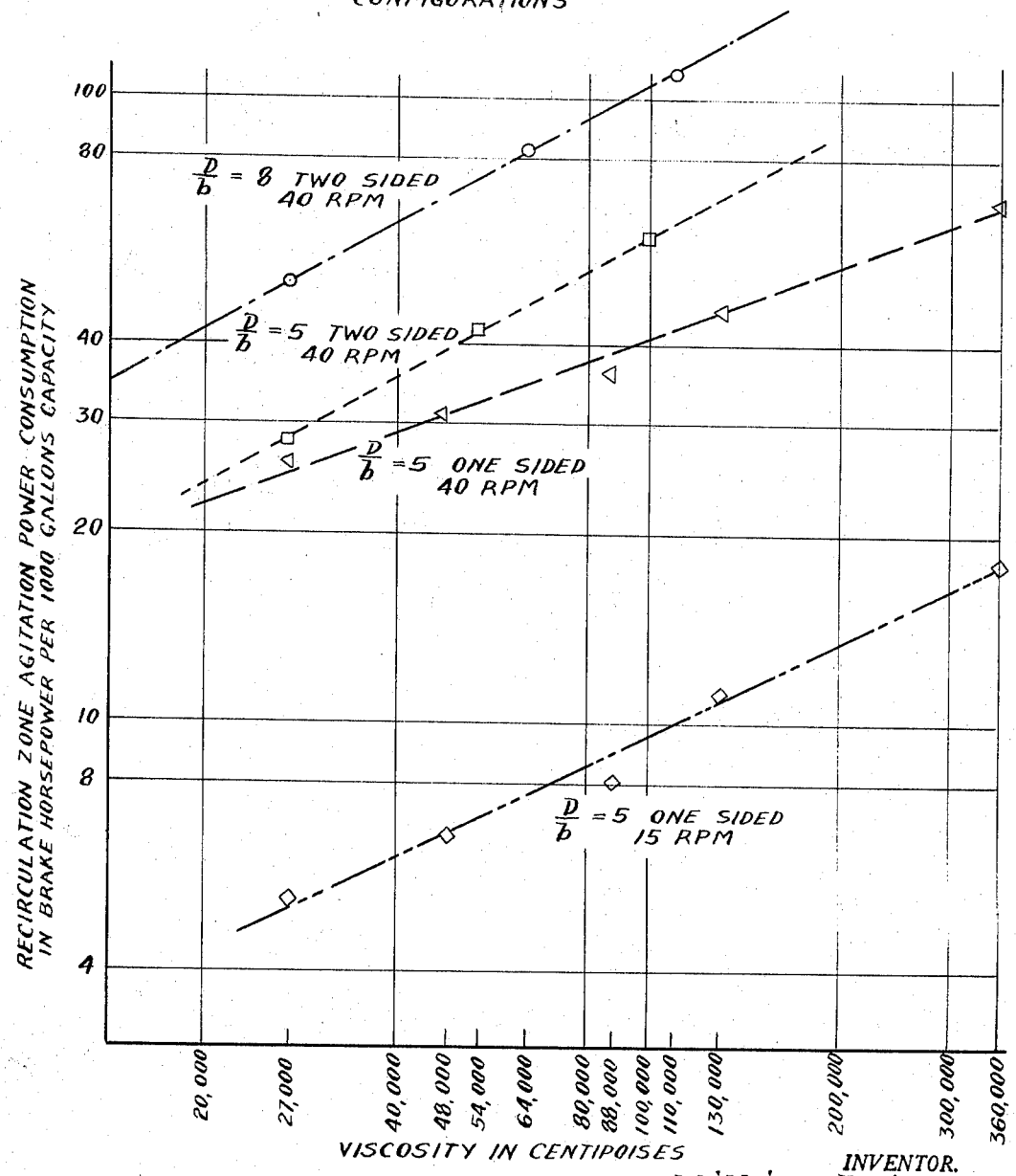

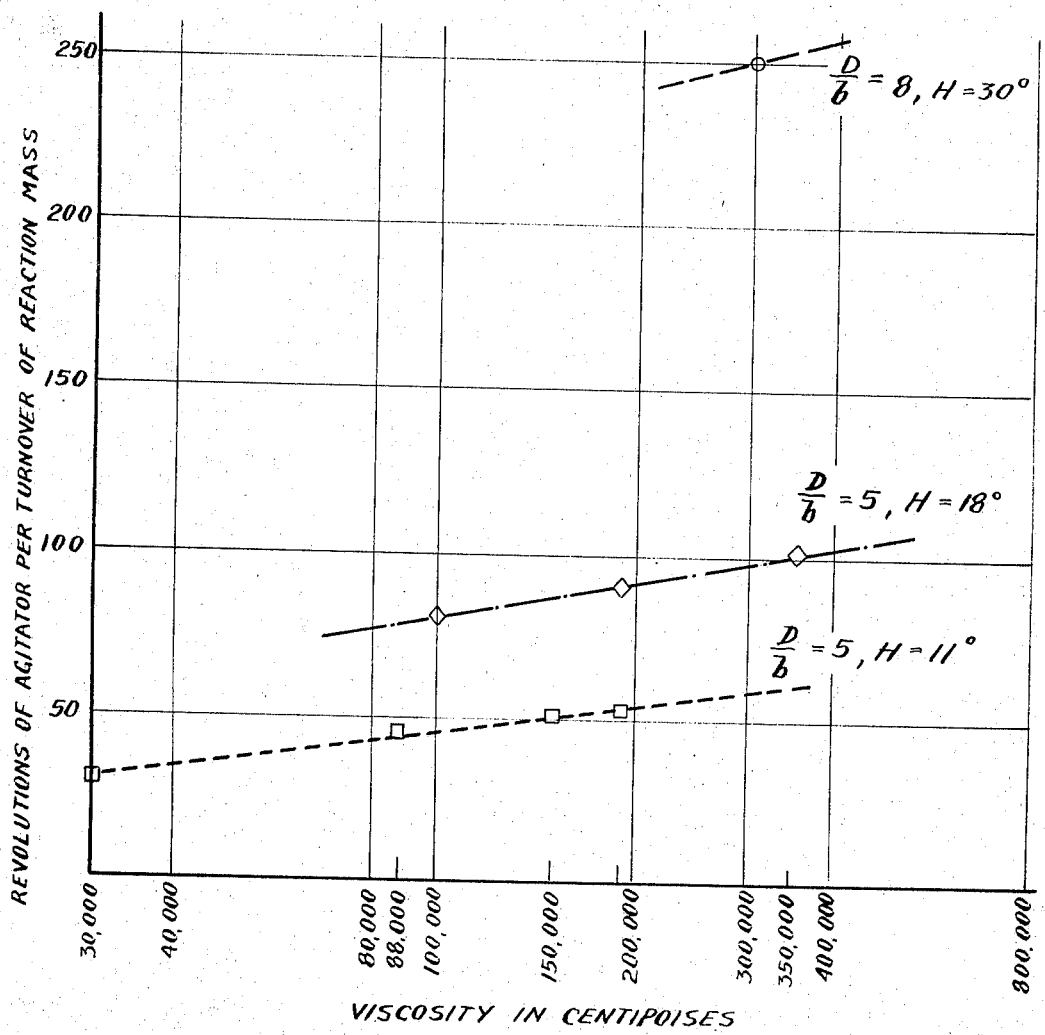

United States Patent Office 3,476,522
Patented Nov. 4, 1969

3,476,522
HIGH VISCOSITY REACTORS
William B. Stovall, Wilton, Conn., assignor to Crawford & Russell Incorporated, Stamford, Conn.
Filed Nov. 16, 1966, Ser. No. 594,863
Int. Cl. F28f 7/10
U.S. Cl. 23—285
9 Claims

ABSTRACT OF THE DISCLOSURE

A high viscosity reactor comprising a central draft tube and at least one annular recirculation zone incorporating a plurality of wiper columns each carrying one or more pivoted scraper blades all coacting with a single heat transfer surface bounding the recirculation zone, and substantially spaced from the opposing boundary heat transfer surface, to permit free unobstructed circulation of the reaction mass between each wiper column and the opposite boundary surface.

---

This invention relates to high viscosity reactors and particularly to stirred or scraped film reactors of the kind shown in J. R. Crawford's United States Patent 3,206,287.

The high viscosity reactors disclosed and claimed in that Crawford patent have proved useful for thorough mixing of large batches of highly viscous materials, such as the polymerization reactants in the bulk polymerization of styrene monomer, for example. The viscosity of such reaction masses increases rapidly with the progress of the polymerization reaction, and large amounts of heat are released by these exothermic reactions. Thorough mixing and stirring of the reaction mass is essential throughout the entire process to assure that the polymerization reaction proceeds uniformly in all parts of the reaction mass without local hot spots or discontinuities which may cause severe variations in the molecular weight range of the polystyrene product.

Furthermore, in some instances it is necessary to add heat to highly viscous materials while performing thorough mixing and stirring, and while maintaining reasonably high heat transfer coefficients. An example of this is the flashing off of unreacted styrene in styrene polymerization processes.

United States Patent 3,206,287 and the co-pending patent application of James R. Crawford, Ser. No. 530,143, filed Feb. 25, 1966, both disclose high viscosity reactors having "scraped" or "wiped film" heat exchange surfaces defining a central draft tube surrounded by an annular recirculation zone. These reactors employ scraper blades moved past the heat exchange surfaces to scrape and fold the reaction mass away from the heat exchange surfaces, while the mass is propelled forcefully through the various reaction zones in the reactor, and while continuous stirring and mixing of the reaction mass provide good heat transfer throughout all parts of the mass.

These prior reactors thus include a draft tube having a helical impeller or ribbon stirrer acting as a feed screw to propel the reaction mass longitudinally along the draft tube, which communicates at both of its ends with the surrounding annular recirculation space through which return flow of the reaction mass occurs. The reaction mass is moved by the impeller in one direction along the draft tube and recirculates in the opposite direction through the annular recirculation space.

In these prior reactors, the scraping or wiped-film action is preferably provided by scraper blades pivotally mounted on the periphery of the impeller and also on longitudinal struts or columns extending longitudinally through the annular recirculation zone and anchored to wiper arms rotatably positioned to sweep them through the annular recirculation zone, where the "drag" exerted by the reaction mass urges the pivoted blades into intimate scraping contact with the adjacent heat exchange surface.

Since both inner and outer scraper blades are supported on the same, common wiper columns, these pivoted scraper blades and their supporting columns occupy substantially the entire radial cross-sectional area of the annular space in these prior reactors, thus necessarily pushing the reaction mass peripherally ahead of themselves around the annular recirculation space as they revolve. For this reason, such prior high viscosity reactors consume large amounts of energy in driving these wiper column assemblies around the annular reaction zones surrounding their draft tubes.

The improved high viscosity reactors of the present invention employ a plurality of longitudinal wiper columns mounted to sweep through the annular recirculation zone, and some of these wiper columns support only pivoted inner scraper blades while the remainder support only pivoted outer scraper blades. Moreover, these wiper columns themselves are positioned close to the heat exchange surfaces which their respective scraper blades ride against, leaving a substantial portion of the cross-sectional area of the annular recirculation zone open for circulation of the reaction mass past the wiper column as it sweeps through the mass.

By this means, the complete blockage of the annular zone's radial cross-sectional area by the prior wiper columns with their mating inner and outer scraper blades is eliminated, and the entire reaction mass need not be driven peripherally around the recirculation zone by the wiper column structures rotating therein. Accordingly, the power required for the actuation of these stirring assemblies is drastically reduced in the reactors of this invention.

Excellent mixing and stirring of high viscosity reaction masses is achieved in the reactors of this invention when the helical impeller or feed screw rotating in the draft tube has a helix angle or pitch between 5 and 20 degrees, as contrasted with the 30-degree pitch common in the prior high viscosity reactors. Furthermore, in my reactors the volume of the annular recirculation reaction zone is markedly increased over the corresponding annular recirculation zone volume of these prior high viscosity reactors, to the point where it equals or substantially exceeds the corresponding volume of the draft tube, thus tending to make the ratio of heat transfer surface to reaction volume in the annular reaction zone and in the draft essentially the same, minimizing temperature variations among different points in the reaction mass. Thus the cross-sectional area of the annular recirculation zone, taken on a transverse cross-section perpendicular to the axis of symmetry of the reactor, which was formerly an area three-quarters or less of the corresponding area of the draft tube, may now be increased to an area of between 100% and 200% of that of the draft tube or larger if desired, with excellent mixing and heat transfer performance of the reactor.

According, a principal object of the present invention is to provide high viscosity reactors having good heat transfer characteristics and producing thorough mixing of the high viscosity reaction mass with minimum agitation power requirements.

Another object of the invention is to provide such reactors with recircalation zones substantially larger in effective transverse cross-section than their draft tubes.

A further object is to provide such reactors with annular recirculation zones incorporating a plurality of wiper columns each carrying one or more pivoted scraper blades all coacting with a single heat transfer surface bounding the recirculation zone, and substantially spaced away from the opposing boundary heat transfer surface, to permit free unobstructed circulation of the reaction mass between each wiper column and the opposite boundary surface.

A further object of the invention is to provide such reactors incorporating helical impellers of moderate pitch between 5 and 20 degrees, mounted for coaxial rotation to propel the reaction mass longitudinally along a draft tube.

Other objects of the invention will in part be obvious and will in part appear hereinafter.

FIGURES 5 and 6 are graphs illustrating the unexpected effectiveness of the features of this invention.

High viscosity reactors

Figure 1:
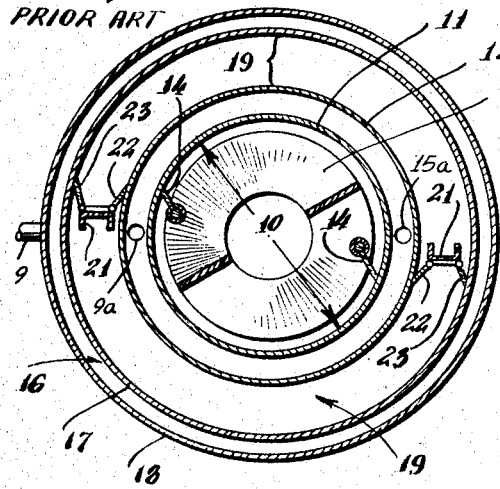
FIGURE 1 is a transverse sectional plan view of a prior art high viscosity reactor of the kind shown in James R. Crawford's United States Patent 3,206,287.

The high viscosity reactors of this invention, like those of James R. Crawford's Patent 3,206,287, preferably incorporate a dual walled heat exchange draft tube. The prior art reactor shown in FIGURE 1 includes a draft tube 10 having an inner wall 11 and an outer wall 12 preferably formed in the shape of a right circular cylinder and provided with a helical impeller 13 which may be a single flight screw or a ribbon stirrer mounted for rotation therein. The impeller 13 may have its outer periphery dimensioned for close juxtaposition with the inner wall 11, with no scraper blades mounted thereon. Alternatively, to eliminate the need for close tolerances in fabrication, the helical impeller 13 may be provided with pivoted scraper blades 14 angularly presented at an acute angle toward the inner wall 11 of the draft tube 10, with the blades 14 being urged pivotally toward inner wall 11 by the drag exerted by the reaction mass as they are driven through it by the rotation of the impeller 13 on which they are pivotally mounted.

Figure 2:
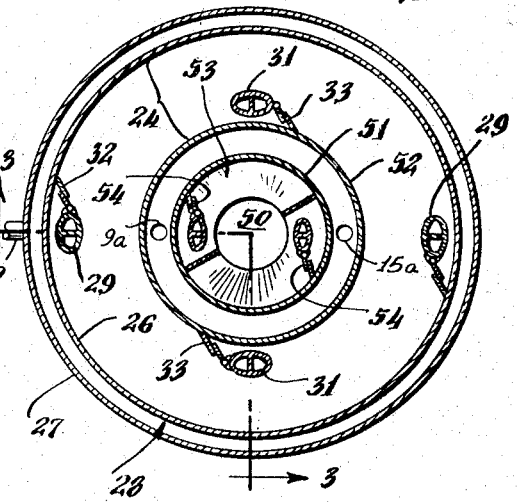
FIGURE 2 is a corresponding transverse sectional plan view of an improved high viscosity reactor incorporating the features of the present invention.

As shown in FIGURE 2, the improved high viscosity reactors of the present invention preferably incorporate these same principal draft tube features—draft tube 50 having an inner wall 51, an outer wall 52 and a central coaxial impeller 53 carrying scraper blades 54—cooperating to mix and propel the reaction mass longitudinally through the draft tube with excellent stirring and heat transfer characteristics, but with the novel modifications described hereafter.

Figure 4:
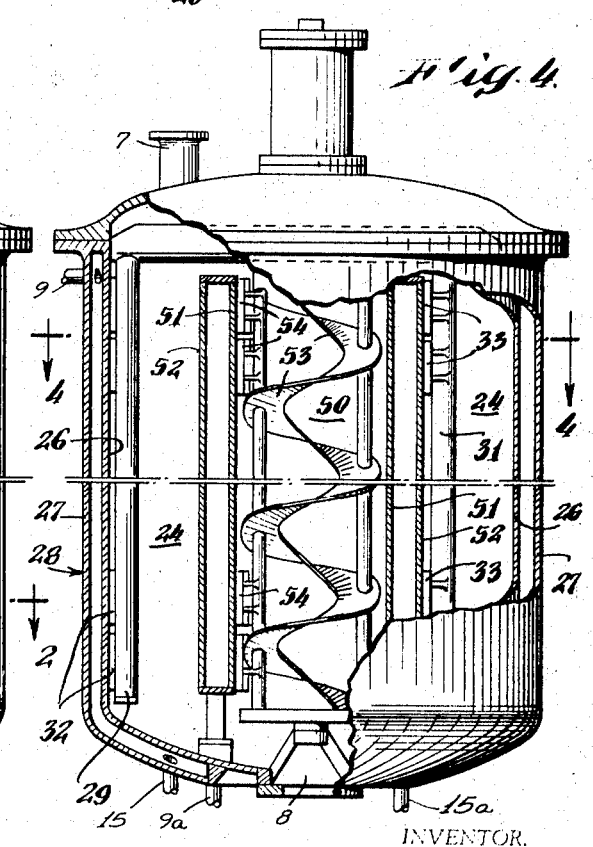
FIGURE 4 is a corresponding sectional front elevation view, similarly broken away, showing a novel reactor incorporating the features of the present invention as shown in FIGURE 2.

As described in Crawford Patent 3,206,297, materials to be treated are normally introduced to these reactors through a top inlet 7 and expelled through a lower outlet 8, as shown in FIGURES 2 and 4.

Jacketed outer wall and recirculation zone

Figure 3:
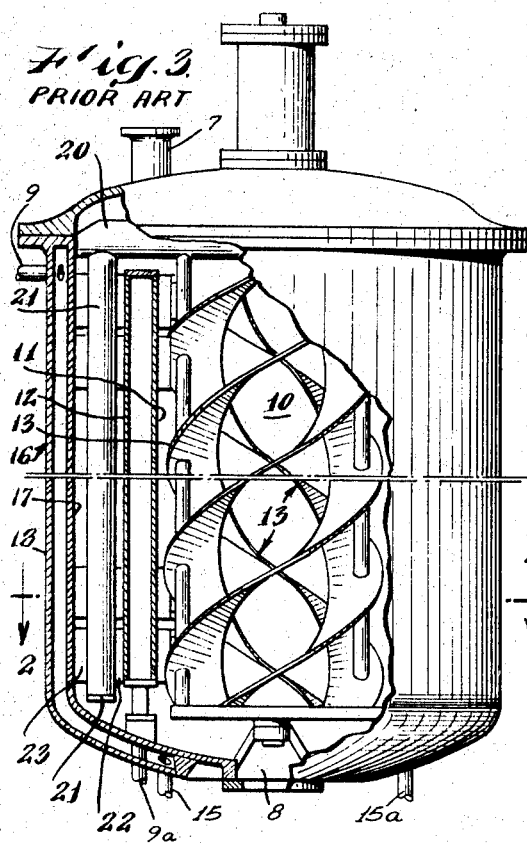
FIGURE 3 is a sectional front elevation view, partially broken away, of the prior art reactor shown in FIGURE 1.

One or more outer annular recirculation zones 19 communicating at both ends with the central draft tube 10 are preferably provided in the high viscosity reactors of this invention, corresponding generally with those shown in Patent 3,206,287 and in prior art FIGURES 1 and 3. Thus a heat exchange jacket forming a dual-walled reactor shell 16 includes an inner tube 17, radially spaced inwardly from a concentric outer tube 18, to form a space between the tubes for the circulation of a heat exchange medium, such as heat exchange oil. Two or more conduits 9 and 15 form inlet and outlet conduits for the heat exchange medium circulating through shell 16, and similar conduits 9a and 15a form inlet and outlet conduits for draft tube 10. Mounted for rotary motion sweeping around the annular recirculation zone 19 is an agitator structure 20 generally incorporating one pair of wiper columns 21 preferably mounted for rotation with the helical impeller 13. In the prior reactor shown in FIGURES 1 and 3, each wiper column 21 is provided with mating pivotally mounted inner scraper blades 22 protruding at acute angles toward the outer wall 12 of draft tube 10, as well as outer blades 23 extending toward the inner wall 17 of the reactor shell 16. These scraper blades together with their supporting wiper columns 21 substantially block the entire radial cross-sectional area of the prior art reactor's recirculation zone 19, as shown in FIGURE 3, requiring that the agitator assembly drive ahead of it peripherally around recirculation zone 19 the entire portion of the reaction mass therein.

In the improved high viscosity reactors of the present invention, a substantially enlarged recirculation zone 24 may be provided surrounding the correspondingly smaller draft tube 50. Thus as shown in FIGURES 2 and 4, an enlarged annular recirculation zone 24 is provided between the outer wall 52 of the draft tube and an inner wall 26 forming with an outer wall 27 an enlarged double-walled reactor shell 28. As shown in FIGURE 4, the walls 26 and 27 are spaced apart to form between themselves a space for heat exchange medium such as cooling oil, and the inner wall 26 is substantially radially spaced outward away from the outer wall 52 of the draft tube 50, making the annular recirculation zone 24 in the improved reactors of this invention substantially larger, when compared with the size of its associated draft tube 50, than is the recirculation zone 19 provided in the similar reactors of the prior art, when compared with its draft tube 10.

Novel agitator assembly

As shown in FIGURES 2 and 4, the agitator assembly in the novel reactors of this invention incorporates a plurality of at least two pairs of wiper columns 29 and 31, each carrying pivoted scraper blades coacting with only one of the heat transfer surfaces bounding the enlarged annular recirculation zone 24.

Outer wiper columns 29 (FIGURES 2, 4) are positioned closely adjacent to the inner wall 26 of reactor shell 28. Scraper blades 32 are pivotally mounted extending angularly forward from columns 29 at an acute angle toward the inner wall 26 of reactor shell 28. These outer blades 32 are urged toward their wall 26 by the "drag" pressure of the reaction mass in zone 24 through which they are moved by rotation of the outer wiper columns 29.

The inner wiper columns 31 (FIGURES 2, 4) are preferably positioned closely adjacent to the outer wall 52 of the draft tube 50. These inner wiper columns 31 pivotally support inner scraper blades 33 projecting angularly forward at an acute angle toward the outer wall 52 which forms the inner bounding surface of the enlarged annular recirculation zone 24.

As will be clearly seen in FIGURES 2 and 4, the outer arms 29 are radially spaced outwardly beyond the center of recirculation zone 24, leaving a wide inner portion thereof open for movement of the reaction mass past columns 29 sweeping therethrough. Correspondingly the inner columns 31 are radially spaced inwardly, inside the center of the reaction zone 24, likewise leaving ample space for circulation of the reaction mass in zone 24 past inner columns 31 sweeping therethrough.

While the pivoted scraper blades supported by the wiper columns 29 and 31 provide excellent "wiped film" scraping of the reaction mass from their adjacent heat transfer boundary surfaces, they constrict but do not block the circulatory flow of the recirculating mass past themselves during their rotational sweeping movement through zone 24. By this means, the portion of the reaction mass recirculating through annular zone 24 is stirred and agitated with excellent heat transfer. It is not bodily moved ahead of the agitator assembly peripherally around zone 24, as in the prior art reactors of FIGURES 1 and 3, and by this means the improved reactors of this invention achieve unexpected reductions in power consumed.

Larger recirculation zones

In conventional high viscosity reactors, the radial width of the recirculation zone 19 is often only one-seventh to one-eighth of its overall outside diameter, as indicated in FIGURE 1. By contrast, in the improved reactors of this invention, the radial width of the annular recirculation zone 24 may be between one-sixth and one-fifth, or more, of the overall outside diameter of zone 24. This substantial increase in the radial width of annular zone 24 increases its effective transverse cross-sectional area from about three-quarters of the corresponding area of draft tube 10 to more than double that figure, perhaps as much as 200% of the transverse cross-sectional area of draft tube 50 in the improved reactor shown in FIGURE 2.

Larger annular recirculation zones provide the reduced power requirements described above, even at higher-than-usual angular velocities. Also, larger annular recirculation zones permit "balancing" of the respective volumes of reaction mass in zones 24 and 50, in terms of their respective bounding heat exchange surface areas, producing steady uniform circulation and recirculation along draft tube 50, through zone 24, and back into draft tube 50, with continuous mixing agitation and excellent heat transfer throughout the entire reaction mass, and tending to avoid any retarded eddies or discontinuous regions where the reaction mass is not evenly moved and agitated. In some high viscosity reactions, the heat introduced by the power consumed in agitation may equal or even exceed the exothermic heat of reaction. The reduced power requirements of my reactors minimize the heat of agitation added by the stirring operation, or permit operation at higher r.p.m. and consequent improved mixing.

Helical impellers of lower pitch

As shown in FIGURE 4, the helical impellers 53 in the draft tubes of the improved reactors of this invention preferably have a low pitch, between 5 and 20 degrees and preferably between 10 and 15 degrees, for example, as compared with the much higher pitches of about 30 degrees in conventional high viscosity reactors such as that illustrated in FIGURE 3. This lower pitch helical impeller, together with the wiper columns 29 and 31 occupying less than half of the longitudinal cross-sectional area of recirculation zone 24 and the substantially enlarged radial width of zone 24 all combine to reduce markedly the drive power required to turn the rotating members of the reactor, the impeller 13 and the agitator assembly of columns 29 and 31 and their associated scraper blades. For corresponding volumes of reaction mass the improved reactors of the present invention require only 40 to 60% of the overall horsepower required to drive the comparable rotary agitator and impeller assemblies of prior reactors. The present invention thus makes it possible to operate at higher rotational velocities, with less frictional heat generated by the agitator assembly. Thus for the same heat transfer area, the net heat transfer capability of the reactor is increased, while the cost and weight of the apparatus and drive mechanism are reduced.

A further advantage of wiper columns 29 and 31 positioned close to their respective heat transfer surfaces is produced by the open space between these columns and the opposite heat transfer surface, since the reaction mass in the annular reaction zone 24 is not moved peripherally at the speed of the rotating agitator assembly. Instead, the recirculating portion of the reaction mass is moved axially through the recirculation zone, and friction heat generated by superfluous angular shearing motion is minimized.

For dynamic balancing of the agitator assembly, it is preferable to have the outer blades 32 mounted on an opposed pair of outer wiper columns 29, and the inner blades 33 mounted on an opposed pair of inner columns 31. Variations of this structure may be employed with good dynamic balancing, however, such as three or four inner wiper columns, with three or four corresponding outer wiper columns. Extruded or rolled section tubular wiper columns 29 and 31 of stainless steel or other suitable alloys provide scraper blade-carrying members of ample strength and stiffness for very large reactors, designed for many thousand gallons of reaction mass, and these tubular columns are therefore preferred in many installations.

In the improved high viscosity reactors of this invention, the relatively large recirculation zones 24 thus provide more rapid recirculation of the reaction mass, vastly reducing the "turnover time" and increasing the number of circulation cycles of the reaction mass occurring during a given treatment period. Reduced turnover time and more rapid recirculation produce improved heat transfer, with more homogeneous polymerized products having the desired range of molecular weight distribution being the highly desirable result, even when the viscosity of the final product exceeds 100,000 cp.

FIGURE 5 and Table I illustrate the significant reduction in power consumption achieved by reactors having the enlarged annular recirculation zones and the "one-sided" wiper columns of this invention and FIGURE 6 and Table II illustrate the increased turnover rate produced by lower helix angles falling within the preferred range of 5° to 20°.

The data shown in these curves and tables was observed during performance runs conducted at the pilot plant of Crawford & Russell Incorporated in Stamford, Conn., using testing apparatus constructed to measure power consumption and turnover time. The test apparatus consisted of a ten-gallon reactor vessel with structural features permitting testing of various interchangeable column and wiper configurations and draft tubes of different sizes. The test reactor vessel was mounted on bearings permitting accurate torque measurementn, and the apparatus was further designed so that turnover times could be precisely observed by insertion of colored material in the circulating reaction mass, and accurately timing its reappearance in the mass after a full circulation cycle.

The parameters governing the test data of Table I plotted in FIGURE 5 include the enlarged recirculation zone, one-sided wiper columns and reduced agitator velocity. The ratio of maximum diameter D of the recirculation zone 24 (i.e., the inside diameter of shell 26) to the radial width $b$ of the zone, both as shown in FIGURE 2, is a measure of the relative size of the recirculation zone 24. This $D/b$ ratio is shown as 8 or 5 in the data of Table I. Also, the one-sided wiper columns 29 and 31 of FIGURE 2 are specified in the final two columns of Table I, and the final column shows agitator r.p.m. reduced from 40 to 15.

TABLE I.—AGITATION POWER CONSUMPTION AT DIFFERENT VISCOSITIES FOR VARIOUS HIGH VISCOSITY REACTOR STRUCTURAL CONFIGURATIONS

[Recirculation zone agitation power consumption in brake horsepower per 1,000 gallons of reactor capacity. Power required to drive helical impeller not included.]

| Ratio | $D/b=8$ | $D/b=5$ | $D/b=5$ | $D/b=5$ |
|---|---|---|---|---|
| Wipers | Two-sided wiper | | One-sided wiper | |
| Velocity, r.p.m. | 40 | 40 | 40 | 15 |
| Viscosities: | | | | |
| 8,000 cp HP | 26 | | | |
| 27,000 cp HP | 50 | 28 | 26 | 5.2 |
| 48,000 cp HP | | | 31 | 6.5 |
| 54,000 cp HP | | 42 | | |
| 64,000 cp HP | 82 | | | |
| 88,000 cp HP | | | 36 | 8.0 |
| 100,000 cp HP | | 60 | | |
| 110,000 cp HP | 110 | | | |
| 130,000 cp HP | | | 45 | 11 |
| 360,000 cp HP | | | 68 | 18 |

In the data recorded in Table II and plotted in FIGURE 6, the $D/b$ ratio of 8, typical of the prior reactors, is shown in the first column, while the $D/b$ ratio of 5 characterising the present invention is shown in the last two columns. Differing helix angles H of 30°, 18° and 11° in the pitch of the central impeller 53, and the observed turnover rates, revolution of impeller 53 to produce one full circulation cycle in the reaction mass, shown the highly effective mixing produced by the reactors of this invention.

TABLE II.—HIGH VISCOSITY REACTOR TURNOVER RATES AT DIFFERENT VISCOSITIES FOR VARIOUS REACTOR STRUCTURAL CONFIGURATIONS

[Revolutions of agitator-impeller per turnover of reaction mass]

| Ratio | $D/b=8$ | $D/b=5$ | $D/b=5$ |
|---|---|---|---|
| Impeller Pitch Angle | $H=30°$ | $H=18°$ | $H=11°$ |
| Viscosities: | | | |
| 30,000 cp | | | 30 |
| 88,000 cp | | | 45 |
| 100,000 cp | | 80 | |
| 150,000 cp | | | 51 |
| 190,000 cp | | 90 | 52 |
| 300,000 cp | 250 | | |
| 350,000 cp | | 100 | |
| 800,000 cp | | | 60 |

It should be noted that this invention is not limited to a reactor with any specific number of draft tubes or wiper columns, and this invention will greatly increase the effectiveness of multiple draft tube designs and reactors having multiple recirculation zones formed between concentric double-walled heat-transfer shells.

While the objects of the invention are efficiently achieved by the preferred forms of the invention described in the foregoing specification, the invention also includes changes nad variations falling within and between the definitions of the following claims.

What is claimed is:

1. In material treatment apparatus having heat exchange surfaces bounding a material treatment zone for a reaction mass, a first inlet and a first outlet for material to be treated opening into the material treatment zone, a second inlet and a second outlet for heat exchange fluid, and means for conducting heat exchange fluid from said second inlet past said heat exchange surfaces to said second outlet, the combination of:
   (a) A plurality of internal concentric cylindrical heat exchange surfaces,
      (1) The innermost of said heat exchange surfaces forming a draft tube constituting a portion of the material treatment zone,
      (2) and the next outermost pair of said heat exchange surfaces bounding an annular circulation and recirculation zone communicating at its ends with both ends of the draft tube, said latter zone constituting the remaining portion of the material treatment zone.
   (b) A helical impeller positioned within said draft tube for moving materials through the draft tube and the recirculation zone,
   (c) a plurality of longitudinal wiper columns mounted for rotation between the pair of heat exchange surfaces of (a)(2) including at least one inner wiper column positioned near the inner surface of the pair and at least one outer wiper column positioned near the outer surface of the pair.
   (d) blade means mounted on each inner wiper column and extending inwardly toward the inner surface of the pair of (a)(2),
   (e) blade means mounted on each outer wiper column and extending outwardly toward the outer surface of the pair of (a)(2), and
   (f) drive means for rotating said impeller and said wiper columns relative to said heat exchange surfaces, whereby materials are scraped from both heat exchange surfaces bounding said annular recirculation zone and are mixed together by eddy motion with material impelled longitudinally through the recirculation zone by the impeller, the inner wiper columns being spaced inwardly away from the outer heat exchange surface of the pair, and the outer wiper columns being spaced outwardly away from the inner heat exchange surface of the pair, to leave ample reaction mass circulation space therebetween.

2. The combination defined in claim 1 wherein the wiper columns are tubular in cross-section.

3. The combination defined in claim 1 wherein each of a plurality of inner wiper columns is arrayed equiangularly and alternately space between a corresponding plurality of outer wiper columns also equiangularly arrayed about the annular recirculation zone bounded by the pair of heat exchange surfaces.

4. The combination defined in claim 1 wherein the helical impeller in the draft tube is provided with a pitch angle between 5° and 20°

5. The combination defined in claim 1 wherein the helical impeller in the draft tube is provided with a pitch angle between 10° and 15°.

6. The combination defined in claim 1 wherein the radial width of the space between the pair of heat exchange surfaces is between one-fifth and one-sixth of the inside diameter of the outer heat exchange surface of the pair.

7. The combination defined in claim 1 wherein the blade means are pivotally mounted on the wiper columns.

8. The combination defined in claim 1 wherein the blade means extend diagonally forward toward their associated surfaces in the direction of column rotation to form acute angles with said surfaces.

9. The apparatus defined in claim 1, further characterized by blade means mounted on the impeller extending outwardly toward the innermost heat exchange surface forming the draft tube portion of the treatment zone.

References Cited

UNITED STATES PATENTS

| 737,973 | 9/1903 | Taylor | 165—91 |
| 3,206,287 | 9/1965 | Crawford | 23—285 |

MORRIS O. WOLK, Primary Examiner

S. MARANTZ, Assistant Examiner

U.S. Cl. X.R.

165—94; 260—95